United States Patent [19]

Takemoto et al.

[11] Patent Number: 5,564,696
[45] Date of Patent: Oct. 15, 1996

[54] METAL OBJECT DETECTION SYSTEM FOR DETECTING THE POSITION OF A METAL OBJECT

[75] Inventors: Takatoshi Takemoto; Kazunari Kawashima, both of Tokyo; Shigeru Handa, Hachioji, all of Japan

[73] Assignee: Kabushiki Kaisha Ace Denken, Tokyo, Japan

[21] Appl. No.: 325,420

[22] PCT Filed: Apr. 28, 1993

[86] PCT No.: PCT/JP93/00562

§ 371 Date: Oct. 28, 1994

§ 102(e) Date: Oct. 28, 1994

[87] PCT Pub. No.: WO93/22618

PCT Pub. Date: Nov. 11, 1993

[30] Foreign Application Priority Data

Apr. 28, 1992 [JP] Japan .................................. 4-110361

[51] Int. Cl.[6] .................................................. A63F 7/02
[52] U.S. Cl. .................................. 273/121 B; 273/120 A
[58] Field of Search ............................ 273/121 B, 237, 273/238, 239, 460

[56] References Cited

FOREIGN PATENT DOCUMENTS

| 55-13867 | 1/1980 | Japan . | |
|---|---|---|---|
| 59-38982 | 3/1984 | Japan . | |
| 62-175602 | 8/1987 | Japan . | |
| 2-279186 | 11/1990 | Japan . | |
| 3-24231 | 4/1991 | Japan . | |
| 4002377 | 1/1992 | Japan | 273/121 B |
| 4-122375 | 4/1992 | Japan . | |

*Primary Examiner*—Jessica J. Harrison
*Assistant Examiner*—Jim Schaaf
*Attorney, Agent, or Firm*—Lowe, Price, LeBlanc & Becker

[57] ABSTRACT

A metal object detection system comprising a matrix sensor having sensing units arranged like a matrix and a signal processing system for driving the matrix sensor for detecting a metal object. The signal processing system comprises circuitry for driving the matrix sensor and inputting a reception signal from the sensor, a plurality of peripheral detection points surrounding a main detection point, and circuitry which, when a metal object detection response is made at the main detection point by a sensing unit contained in the monitor frame, compares the response with a response of each of other peripheral detection points in the frame. When, the response of the main detection point is the largest, the circuitry determines that a metal object exists at the main detection point.

15 Claims, 14 Drawing Sheets

| NO. OF SETUP POINTS | 9 | 13 | 25 |
|---|---|---|---|
| SETUP FORM | | | |
| REMOVAL OF EFFECT WHEN PINBALL APPROCHES A MONITOR FRAME | × | ○ | ○ |
| PROCESSING TIME | ○ | ○ | × |
| TOTAL | △ | ○ | △ |

FIG. 13

METAL OBJECT DETECTION SYSTEM FOR DETECTING THE POSITION OF A METAL OBJECT

FIELD OF THE INVENTION

This invention relates to a metal object detection system for detecting the position of a metal object and in particular to a metal object detection system for sensing the presence or absence of a metal object and, if it exists, sensing the position thereof by using a matrix sensor which comprises a matrix of sensing regions provided by a plurality of transmission lines and a plurality of reception lines.

BACKGROUND OF THE INVENTION

It may become necessary to detect the position of a metal object in a determined area, particularly in a plane area, for example, to detect a movement path of a metal object moving in a plane area or when metal objects are distributed in one area, to detect their distribution pattern. A specific example of the former is to detect a movement path of game play media in a game machine.

With some game machines, a player moves a metal substance, such as a metal ball, in a specific space set in the game machine and may or may not win the play depending on the destination of the metal ball. Pinball machines are typical of such game machines; with a pinball machine, a player plays a game by dropping a metal ball called a "pinball" in a space sandwiched between parallel planes in which a large number of obstacles are located.

A general pinball machine has a base board for providing a space required to move pinballs, a glass plate spaced from the base board at a given interval to cover the base board, and a propelling mechanism for propelling pinballs into the space provided by the base board and the glass plate. The pinball machine is set up so that the base board becomes substantially parallel to the vertical direction. The base board is formed with a plurality of safe holes for the player to enter a pinball in for a winning game play through which the pinball is discharged from the base board and an out hole into which pinballs that have not entered into the safe holes are finally collected for discharging the pinballs from the base board.

A large number of pins (nails) are set up substantially vertically to the base board in a state in which they project from the base board up to a distance which is as long as the diameter of a pinball, to act as obstacles with which pinballs dropping along the base board frequently collide, causing their motion direction to fluctuate. The pins are located on the base board with a distribution determined so as to guide pinballs colliding with the pins toward or away from the safe holes while causing the motion directions of the pinballs to fluctuate.

Incidentally, winning game play conditions at each pinball machine need to be managed at pinball parlors having a large number of such pinball machines. That is, it is necessary to sense whether or not a pinball enters each safe hole.

A conventional metal object detection system for such purposes is described in Japanese Patent Laid-Open No. Hei 4-122375.

In the gazette, a sensor comprising transmission lines and reception lines is proposed. That is, looped transmission lines are installed on one face of a wiring board and a plurality of parallel looped reception lines are installed on the opposing face of the wiring board crossing the transmission lines, so that the reception lines are electro-magnetically coupled with the transmission lines. The transmission lines and reception lines of this sensing matrix are connected to a transmission circuit and reception circuit of a controller, a signal current is made to flow into the transmission lines in sequence, and current induced by the signal current is taken out for each reception line in sequence, whereby the presence or absence of a metal object is detected from the induced current detected at the reception circuit and the position of the metal object can be detected from a combination of the transmission line on which the signal current flows and the reception lines on which the induced current is received. That is, the sensing matrix has the intersections of the transmission and reception lines as sensing units, which are placed like a matrix.

In such a metal object detection system, when a metal object exists at one point, it generates a response in the sensing unit nearest to its position and the sensing units surrounding it are also affected. Particularly, the effect is large if the transmission and reception lines are placed at a high density. Thus, if simply a signal output of a sensing unit is found and it is determined that a metal object exists at the position of the sensing unit, it is also judged that a metal object, such as a pinball, exists in the vicinity of the position where it is actually present. Thus, the position of the metal object cannot be detected accurately.

Particularly, to monitor whether or not a metal object, such as a pinball, enters one sensing unit, even if a pinball exists only in the vicinity of the sensing unit, the sensing unit also responds to it, outputting a signal as if a metal object actually existed. Thus, although a metal object does not actually enter the sensing unit, it is erroneously determined that a metal object enters the sensing unit.

SUMMARY OF THE INVENTION

It is therefore an object of the invention to provide a metal object detection system which can detect the position of a metal object accurately.

To the end, according to one form of the invention, there is provided a metal object detection system comprising a matrix sensor having a detection area spreading over plane and a signal processing system for driving the matrix sensor for detecting a metal object, the matrix sensor having a plurality of sensing units arranged like a matrix, the signal processing system comprising:

means for setting a monitor frame consisting of a plurality of two-dimensionally distributed sensing units in a specified area, selected from among the sensing units contained in the matrix sensor;

means for driving the matrix sensor and inputting a reception signal from the sensor; and means for determining whether or not a metal object exists with respect to a signal from the sensing units belonging to the monitor frame with respect to a signal in each sensing unit of the matrix sensor input by the reception signal input means, wherein the monitor frame setting means assigns at least one sensing unit to a main detection point corresponding to a target position to detect a metal object and assigns a sensing unit to each of a plurality of peripheral detection points placed surrounding the sensing unit belonging to the main detection point; and wherein when a metal object detection response is made at the main detection point for a signal from a sensing unit contained in the monitor frame, the means for determining whether or not a metal object exists compares the response with a response of the sensing unit of each of other peripheral detection points in the frame, and when the response of the main detection point, is the largest, determines that a metal object exists at the main detection point.

The monitor frame is set like a quadrilateral containing a plurality of sensing units therewithin. The main detection point can consist of one sensing unit positioned at the center of the monitor frame or a plurality of sensing units near the center of the monitor frame.

For example, the matrix sensor comprises a plurality of transmission lines excited by a signal current, a plurality of reception lines being placed crossing the Plurality of transmission lines for receiving an induced current by exciting the transmission lines, and a board for supporting the lines, crossing portions of the transmission and reception lines being placed like a matrix as sensing units.

The system of the invention can be mounted on a pinball machine having a game area spreading over a plane and can be used for detecting the presence or absence of a pinball at a specific position in the game area on the pinball machine. In this case, the matrix sensor can have a form placed facing a base board on which the game area of the pinball machine is provided, and the signal processing system can drive the sensor for sensing a pinball.

The monitor frame setting means can set the main detection point at a position of a safe hole—if a player enters a pinball in the safe hole, the player wins the game play—made on the pinball machine and the peripheral detection points surrounding the main detection point when the matrix sensor is fitted to the pinball machine.

The monitor frame setting means can further include means for storing information specifying a sensing unit positioned at the detection point belonging to the main detection point monitor frame.

The signal processing system can further include means for setting a plurality of sensing units as propelled pinball detection points in a portion into which pinballs are propelled in the game area of the pinball machine, and means for determining detection of a pinball propelled into the game area if a signal from any of the sensing units belonging to the setup detection points changes compared with a predetermined criterion.

The signal processing system can further include a counter for counting the number of pinballs detected at the main detection point.

The signal processing system can further include a counter for counting the number of pinballs detected at any of the propelled pinball detection points.

According to the configuration, even if a plurality of sensing units on the matrix sensor respond to a metal object, whether or not the metal object exists at the main detection point can be determined precisely. Therefore, the system of the invention can be used effectively for determining winning game plays, etc., at game machines including pinball machines.

BRIEF DESCRIPTION OF THE DRAWINGS

In the accompanying drawings:

FIG. 13 is an illustration showing monitor frame structures and their performance comparison.

DESCRIPTION OF THE PREFERRED EMBODIMENT

Referring now to the accompanying drawings, there is shown one preferred embodiment of the invention.

Prior to the description of the embodiment, pinball machines to which the embodiments of the invention are applied will be discussed with reference to FIG. 3.

Figure 3:
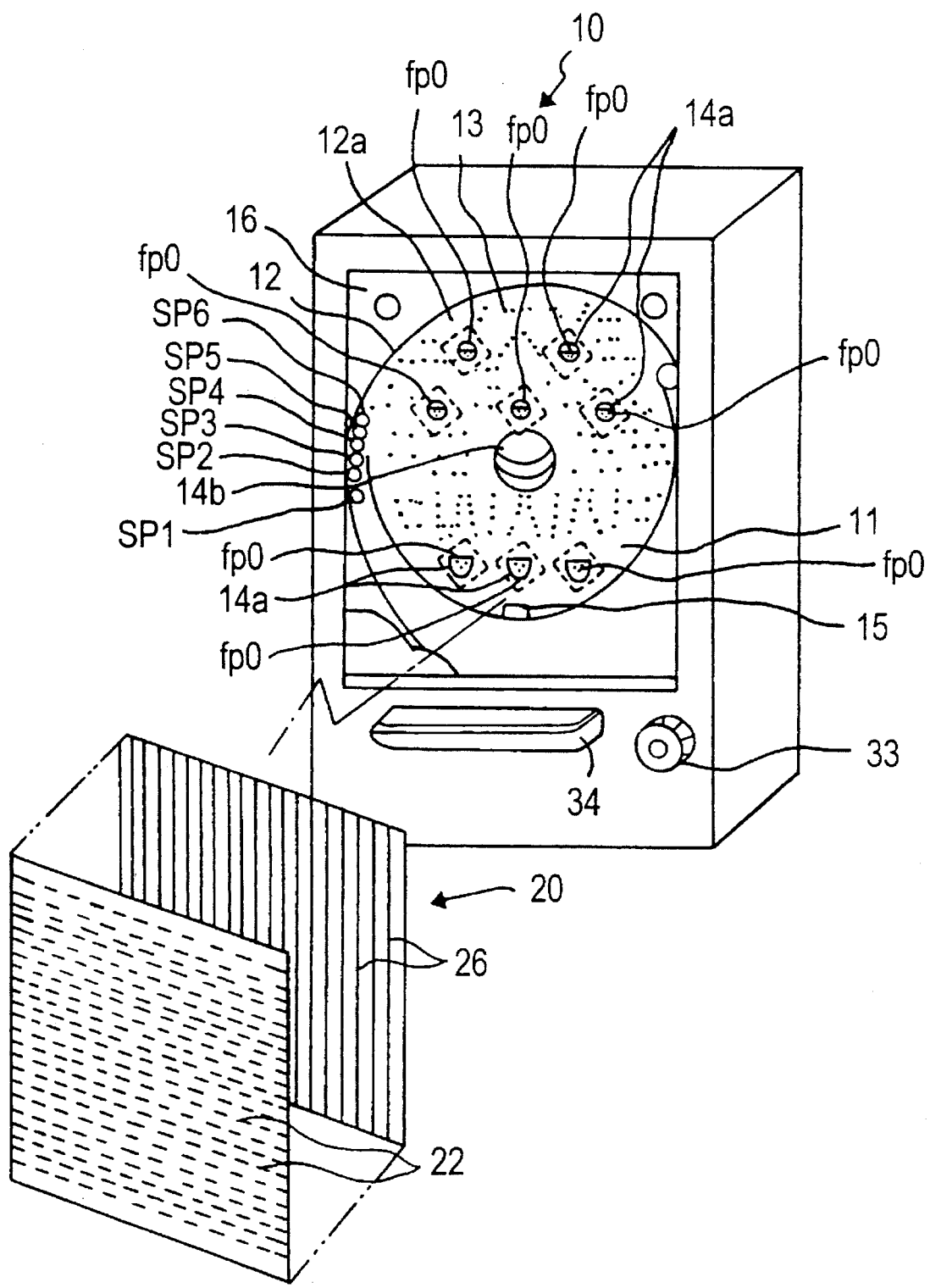
FIG. 3 is a perspective view showing an example of a pinball machine to which a metal object detection system of the invention is applied.

The pinball machine shown in FIG. 3 has a base board 11 for providing a space required to move pinballs, a surface glass substance 16 spaced away from the base board by a given distance, to cover the base board, and a propelling mechanism for propelling pinballs into the space provided by the base board 11 and the surface glass substance 16. The pinball machine is set up so that the base board 11 becomes substantially parallel to the vertical direction.

The base board 11 is provided with a guide rail 12. The inner area of the base board 11 surrounded by the guide rail 12 provides a game area 12a. The guide rail 12 guides a pinball propelled by the propelling mechanism along the rail to the upper position (upstream part) in the vertical direction of the game area 12a.

The game area 12a is formed with a plurality of safe holes 14a which the player attempts to cause a pinball to enter into for a winning game play through which the pinball is discharged from the base board 11, a winning game play effect device 14b being located at the center of the base board for providing a special winning game play condition, and an out hole 15 into which pinballs not entered in the safe holes 14a are finally collected for discharging the pinballs from the base board 11. The winning game play effect device 14b is a device whose state changes each time a pinball enters a specific safe hole 14a, and which pays out a large number of pinballs to the player for a winning game play when a certain condition is satisfied. For example, rotating drums, such as with a slot machine, are provided and each time the player wins a game play, the drums are rotated. When a predetermined symbol pattern is complete, a large number of pinballs are paid out to the player for a special winning game play.

Figure 4:
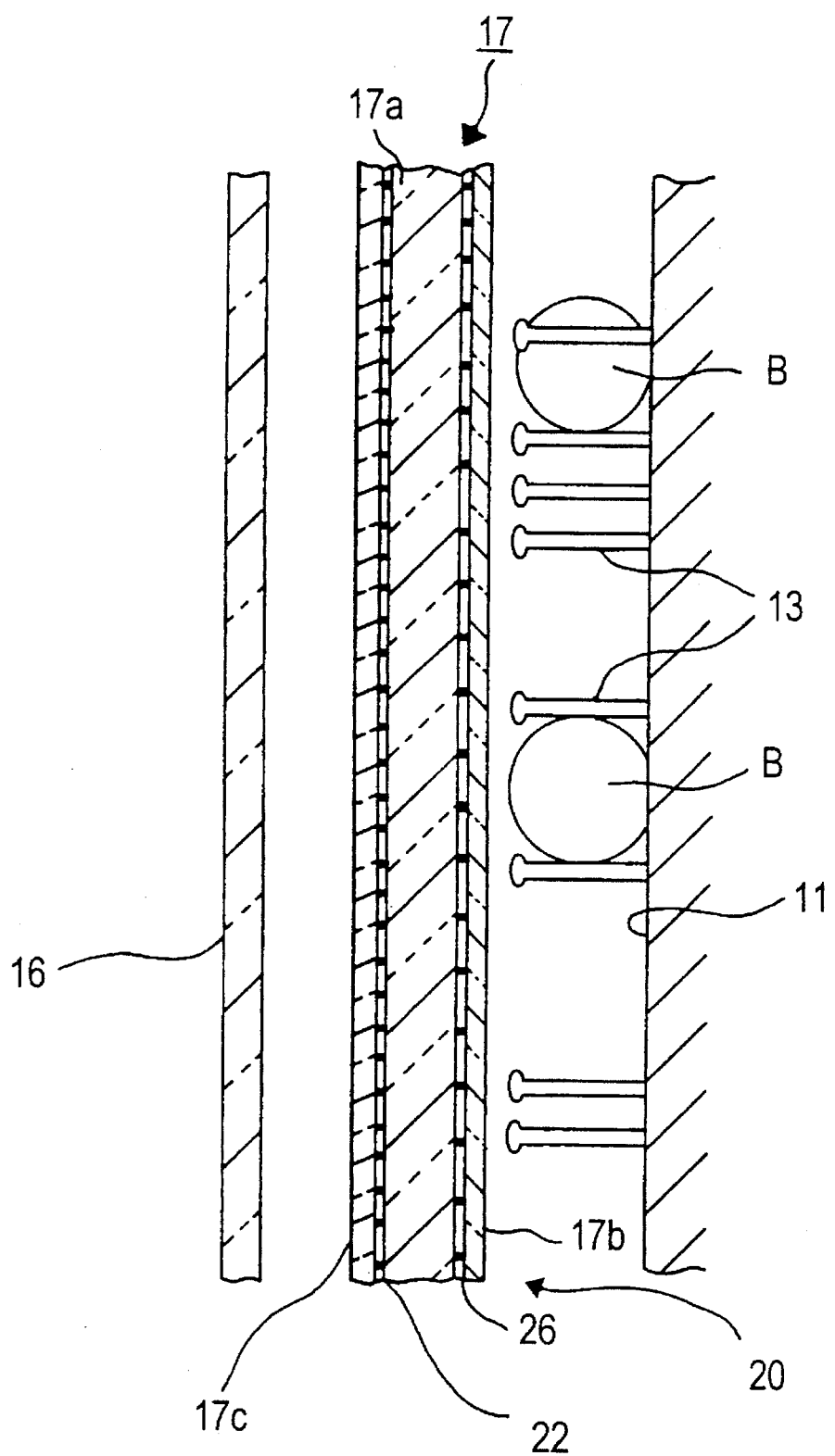
FIG. 4 is a sectional side view of a base board of the pinball machine.

The game area 12a of the base board 11 is provided with a large number of pins (nails) 13 with which pinballs B dropping along the base board 11 frequently collide for causing their motion direction to fluctuate. The pins 13 are hammered into the base board 11 substantially perpendicular to the base board 11 in a state in which they project from the base board 11 by a distance which is as long as the diameter of the metal object B, as shown in FIG. 4. The pins 13 are distributed over the base board 11 for the purposes as described above.

A propelling handle 33 to allow players to propel pinballs, and a pinball return 34 for receiving pinballs paid out for winning game plays, are located on the front face of the pinball machine 10. The handle 33 is a part of the propelling mechanism.

As shown in FIG. 4, front glass covering the base board 11 has a double structure consisting of the surface glass substance 16 and an inner glass substance 17 along the base, board 11 of the pinball machine 10. The inner glass substance 17 consists of a glass substrate 17a and surface glass 17b and 17c bonded to both faces of the glass substrate 17a.

Next, a pinball detection system as one embodiment of a metal object detection system of the invention will be discussed with reference to the accompanying drawings.

Figure 6:
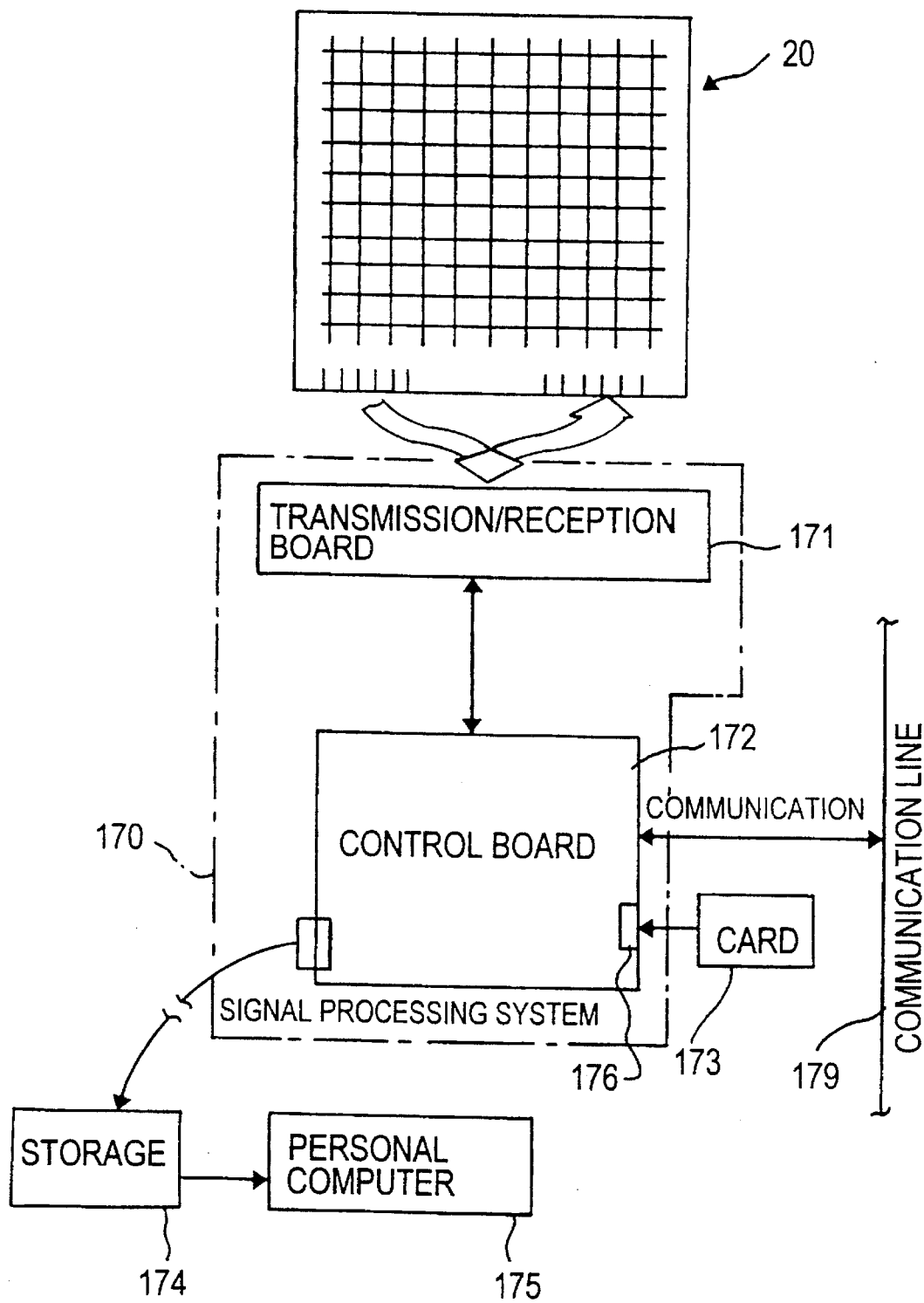
FIG. 6 is a block diagram showing the configuration of a first embodiment of the invention.

The pinball detection system of the embodiment comprises a matrix sensor 20 having a detection area spreading over a plane and functioning as a metal sensor and a signal processing system (signal processing device) 170 which drives the matrix sensor 20 for sensing the presence of a metal object and detecting the position thereof, as shown in FIG. 6.

Figure 5:
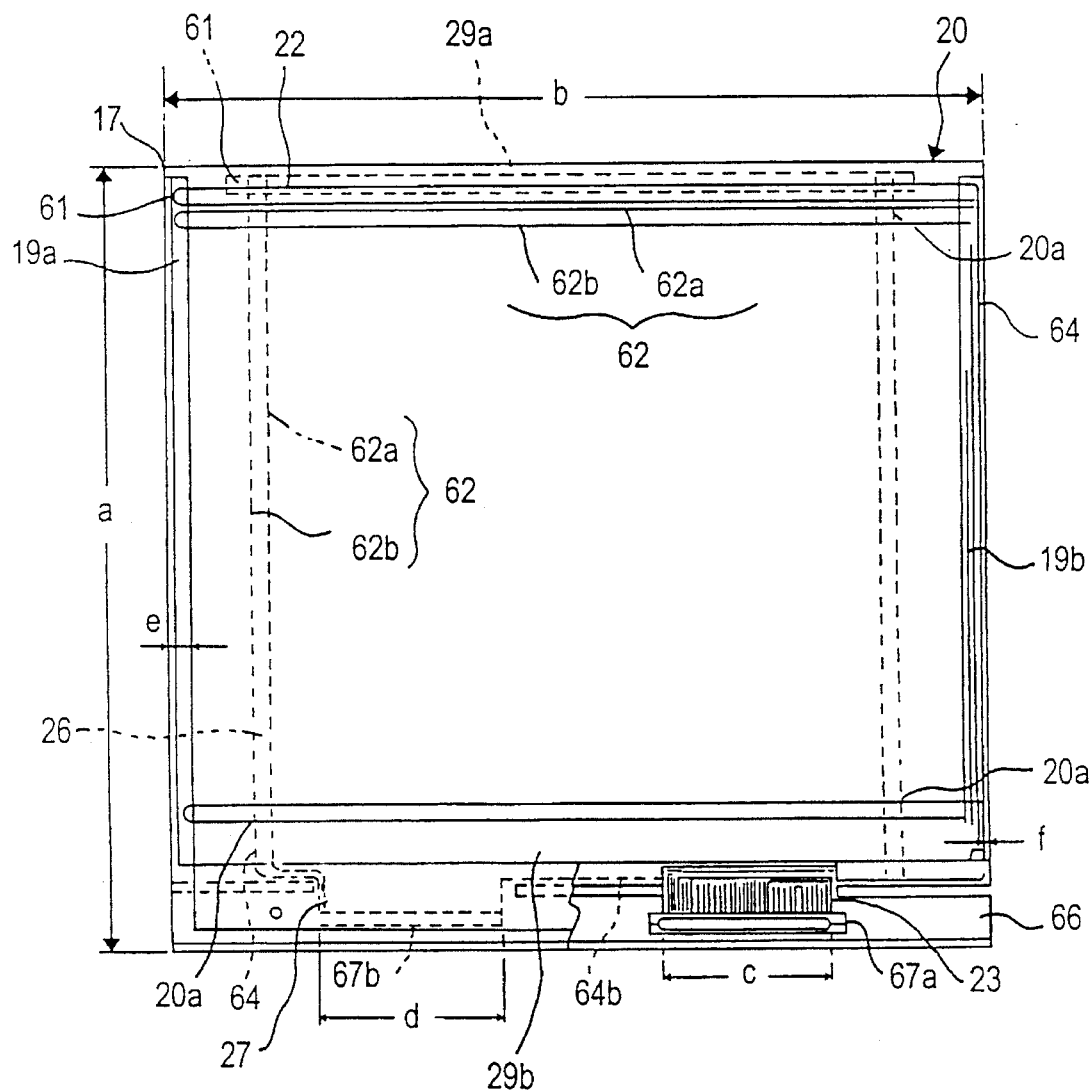
FIG. 5 is a front view showing a matrix sensor.

The matrix sensor 20 has a plurality of transmission lines 22, a plurality of reception lines 26, and a board for supporting the lines, as shown in FIG. 5. Each of the transmission lines 22 consists of a pair of conductors 62 forming a sending path 62a and a returning path 62b, which are parallel. Likewise, each of the reception lines 26 consists of a pair of conductors 62 forming a sending path 62a and a returning path 62b, which are parallel. In the embodiment, the conductor 62 is made of copper wire coated with polyurethane for insulation, for example. A pair of the conductors 62 comprises a sending path and a returning path connected on one end and serving as input and output terminals of a signal on the other end.

The transmission lines 22 and the reception lines 26 are placed so as to cross each other. Specifically, for example, the transmission lines 22 are arranged at given intervals in a row direction and the reception lines 26 are arranged at given intervals in a column direction. The transmission lines 22 and the reception lines 26 are placed in such a manner as to provide the crossing portions of the transmission lines 22 and the reception lines 26 like a matrix as sensing regions. Either the transmission lines 22 or the reception lines 26 may be placed in the row or column direction as desired.

The signal processing system 170 has a transmission/reception board 171 functioning as transmission/reception means for driving the matrix sensor 20 and a control board 172 functioning as signal processing means for controlling the transmission/reception board 171 for receiving a detection signal and determining whether or not a metal object exists, based on the detection signal and detecting the position of the metal object sensed when a metal object exists.

The transmission/reception board 171 has a transmission circuit 40 (see FIG. 7) for scanning the specified lines of the transmission lines 22 in sequence and sending a transmission signal thereto and a reception circuit 50 (see FIG. 9) for scanning the specified lines of the reception lines 26 in sequence and reading reception signals of the reception lines in sequence, as described below. The control board 172 specifies the transmission and reception lines to be scanned for the transmission/reception board 171, determines whether or not a pinball exists from a signal received at the reception circuit 50, and detects the pinball sensed position based on information indicating the transmission line scanning position at the transmission circuit 40 and information indicating the reception line scanning position at the reception circuit 50.

The control board 172 can store information indicating the position of a pinball in time sequence for finding the movement path of the pinball. From the movement path, the characteristics of the pinball machine can be known and an abnormal path can also be detected for judging whether or not an illegal operation has been performed.

Next, the matrix sensor will be described in more detail.

As shown in FIG. 4, the matrix sensor 20 is formed like a plane within the inner glass substance 17, which is on the side of the base board 11, of the two glass substances covering the base board 11, and therefore is disposed between the front glass substance 16 and the base board 11.

As shown in FIG. 5, in the matrix sensor 20, a plurality of transmission lines 22 are placed on one face (on the side of the surface glass) of the glass substrate 17a of the inner glass substance 17 in parallel in one direction. Each transmission line 22 is located on the glass substrate 17a so as to make a U-turn (parallel turn form) at the end of the glass substrate 17a.

Likewise, a plurality of reception lines 26 are placed on the opposing face (on the side of the base board 11) of the glass substrate 17a of the inner glass substance 17 in parallel in one direction. Each reception line 26 is located on the glass substrate 17a so as to make a U-turn (parallel turn form) at the end of the glass substrate 17a. A transmission terminal section 23 and a reception terminal section 27 functioning as connection sections of the transmission lines 22 and the reception lines 26 are placed collectively on the lower end of the inner glass substance 17 in a vertical direction, when the matrix sensor is mounted on a pinball machine.

The reception lines 26 are located at right angles to plane parallel positions with the transmission lines 22 so as to be electro-magnetically coupled with the transmission lines 22, namely, in positional relation such that a magnetic flux from the transmission line 22 interlinks. The transmission lines 22 and the reception lines 26 with the inner glass substance 17 as a substrate make up the plane matrix sensor 20.

As shown in FIG. 5, square portions formed by the transmission lines 22 and the reception lines 26 crossing each other, which are detection positions, provide sensing units, 20a, 20a, . . . for sensing a pinball. In the embodiment, the sensing unit 20a is set to a size being capable of sensing a pinball.

The inner glass substance 17 is a glass substrate of a quadrangle having dimensions of 367 mm ±10 mm in length a and 367 mm ±10 mm in width b and 3.0–3.5 mm in thickness. Both of the surface glasses 17b and 17c are shorter than the glass substrate 17a in length and the lower end of the glass substrate 17a is exposed.

To form the inner glass substance 17, the transmission lines 22 are bonded to one face of the glass substrate 17a with a transparent adhesive layer and the surface glass 17c is bonded thereon with a transparent adhesive layer; the reception lines 26 are bonded to the other face of the glass substrate 17a with a transparent adhesive layer, and the surface glass 17b is bonded thereon with a transparent adhesive layer.

As shown in FIG. 5, a turn substrate 19a and a transmission route substrate 19b shaped like an letter L, are disposed in the left end part and right end part, respectively, on one face of the glass substrate 17a. A turn substrate 29a and a route substrate 29b are disposed in the upper end part and lower end part, respectively, on the other face of the glass substrate 17a.

As shown in FIG. 5, each of the transmission lines 22 consists of a turn part 61 formed on the turn substrate 19a and wires 62a and 62b soldered to the turn part 61. The input and output terminals of the transmission line 22 are connected via route wire to the transmission terminal section 23.

On the other hand, as shown in FIG. 5, each of the reception lines 26 consists of a turn part 61 formed on the turn substrate 29a and wires 62a and 62b soldered to the turn part 61. The lower end part of the reception line 26 is connected to the reception terminal section 27 by a route part 64 formed on the route substrate 29b bonded to the lower end of the other face of the glass substrate 17a.

To make the wires 62a and 62b invisible to the customers, their surfaces are of a matt black finish, intended to prevent light reflection.

A preferred pattern of the matrix sensor 20 of a normal pinball machine 10 consists of 32 rows of transmission lines 22 and 32 columns of reception lines 26, namely, 1024 sensing units 20a in total. The embodiment takes the pattern of the 32 rows of transmission lines 22 and 32 columns of reception lines 26 as an example. In FIG. 5, only outer parts of the pattern are shown.

Preferably, each of the wires making up the transmission lines 22 and the reception lines 26 is 25 μm–30 μm thick. In the embodiment, as shown in FIG. 5, the overall widths of the transmission terminal section 23 and the reception terminal section 27, c and d, are each 126 mm and the widths of the longitudinally extending portions of the transmission turn substrate 19a and the transmission route substrate 19b, e and f, are formed to each be 10 mm or less. The width of one line of the transmission terminal section 23 and the reception terminal section 27 is 1.5 mm.

The matrix sensor 20 is formed with a connector mounting plate 66 at the lower end part of the glass substrate 17a. The connector mounting plate 66 has two sides, between which the lower end of the glass substrate 17a is sandwiched, and is integral with the inner glass substance 17. The connector mounting plate 66, which is made of plastic or stainless material, extends downward along the width of the inner glass substance 17 and is on an extension plane of the inner glass substance 17 of the matrix sensor 20.

A transmission connector 67a and a reception connector 67b are fixed to the positions of the connector mounting plate 66 corresponding to the transmission terminal section 23 and the reception terminal section 27. The terminals of the transmission terminal section 23 and the reception terminal section 27 are connected via the transmission and reception connectors to the transmission circuit 40 and the reception circuit 50.

The connector mounting plate 66 has the thickest portions in which the transmission connector 67a and the reception connector 67b are mounted. On the other hand, the transmission connector 67a and the reception connector 67b are short and the thickest portion of the connector mounting plate 66 is as thick as or thinner than the inner glass substance 17 of the matrix sensor 20.

The transmission/reception board 171 (see FIG. 6) connected to the transmission connector 67a and the reception connector 67b is placed on the connector mounting plate 66. The transmission/reception board 171 has the transmission circuit 40 (see FIG. 7) for transmitting signals to a plurality of transmission lines 22 of the matrix sensor 20, the reception circuit 50 (see FIG. 9) for receiving signals from a plurality of reception lines 26, and junction connectors (not shown) connected to the transmission connector 67a and the reception connector 67b.

The junction connectors are connected to the transmission connector 67a and the reception connector 67b for connecting the transmission terminal section 23 to the transmission circuit 40 and the reception terminal section 27 to the reception circuit 50.

Next, the signal processing system which processes signals from the matrix sensor 20 will be described.

As shown in FIG. 6, the matrix sensor 20 is placed under the control of the control board 172 spaced from the matrix sensor 20 via the transmission/reception board 171. The control board 172 has an information processor 30 shown in FIG. 1 and can communicate with other systems on a communication line 179. The control board 172 also has an interface section 176 for reading monitor points from a card 173. The information processor 30 has at least a central processing unit (CPU) 30a and a memory 30b for storing CPU programs and data.

The card 173 is a memory card that can be mounted and demounted on the interface section 176. The card 173 stores at least data indicating pinball monitor points such as safe points for detecting pinballs entering safe holes 14a, 14a, . . . provided on the base board 11 of a pinball machine 10, propelled pinball points for detecting pinballs propelled into a game area 12a, and the position of an out hole 15, and an algorithm for detecting pinballs entering the monitor points as monitor data. It also stores a safe detection algorithm shown in FIG. 2.

Figure 11:
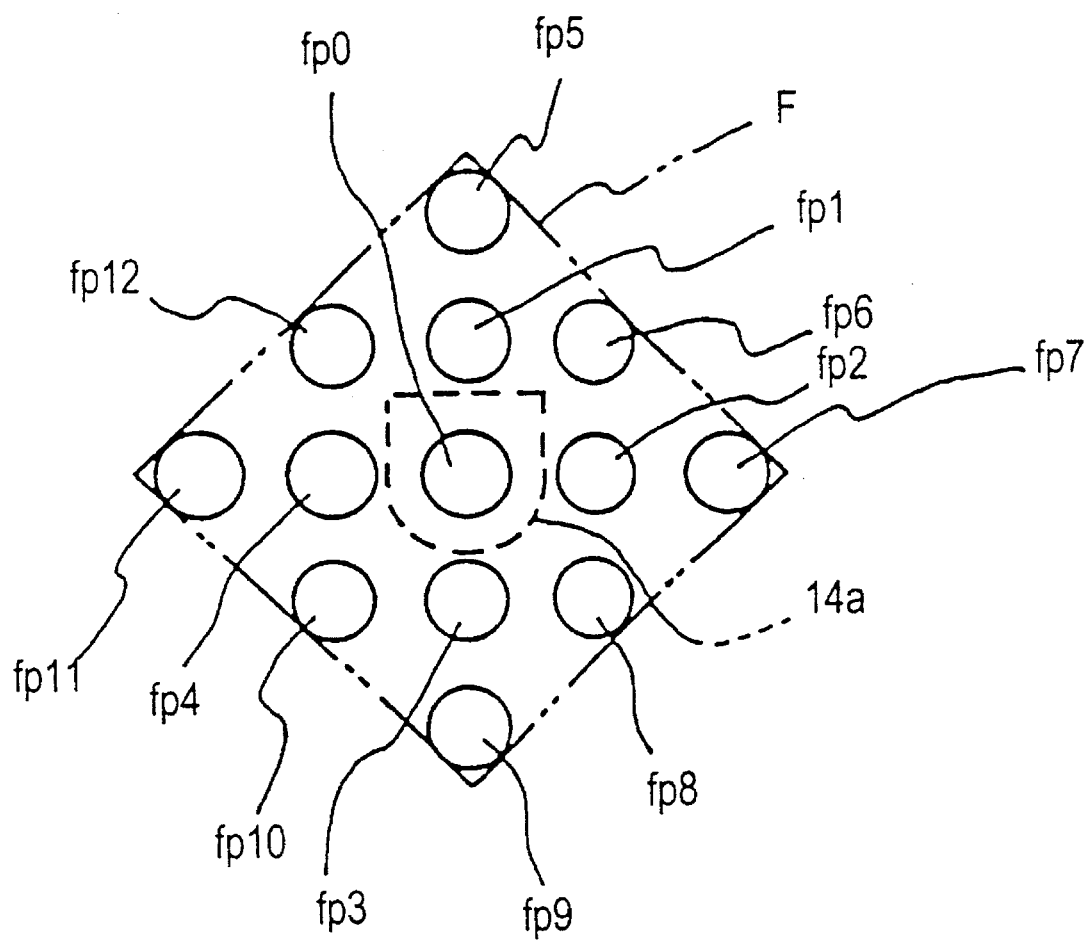
FIG. 11 is an illustration showing an arrangement example of detection points in a monitor frame.

Safe or winning game plays are detected by forming a monitor frame F containing a plurality of detection points. The monitor frame F is provided for each safe hole 14a. As the detection points making up the monitor frame F, 13 points fp0–fp12 are provided in the embodiment. The monitor frame F is set like a quadrilateral having the opening position of safe hole 14a as the intersection of diagonal lines, as shown in FIG. 3. The quadrilateral is set to a size to allow the 13 detection points to be contained therewithin. The quadrilateral is placed so that a pair of vertexes as diagonal become the top and bottom of the quadrilateral, as shown in FIG. 11. A main detection point (safe point) fp0 in the sensing unit corresponding to the safe hole position is placed at the intersection of the diagonal lines, and peripheral detection points fp1–fp12 are placed surrounding the main detection point.

Figure 12:
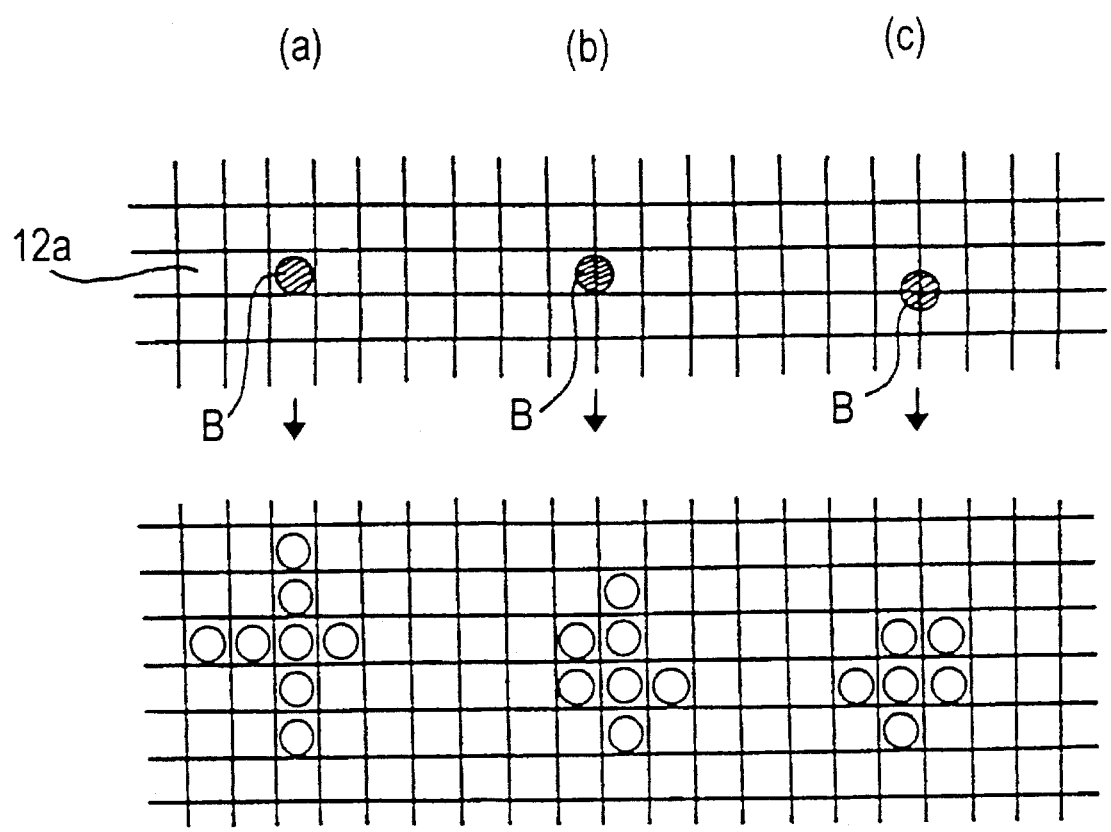
FIG. 12 is an illustration showing response examples in sensing units of the matrix sensor for pinballs.

Such placement of the monitor frame F for safe (winning game play) detection is based on the results of experiments carried out by the inventors and associates. That is, the inventors and associates examined how pinballs are sensed in each sensing unit 20a of the matrix sensor 20 in the game area 12a of a pinball machine. FIG. 12 is an illustration showing the experiment. In FIG. 12, the lattice shows a schematic arrangement of the sensing units 20a ; the quadrilateral parts surrounded by lines are the sensing units 20a.

First, when a pinball B exists at a position overlapping one sensing unit 20a (a), if a detection response from the sensing units near it is examined, the presence of the pinball is sensed in the sensing units 20a existing on the cross line having the sensing unit 20a overlapping the pinball as the center. When the pinball B extends over two sensing units (b) or four sensing units (c), the pinball is sensed in the sensing units 20a distributed in the longitudinal direction and lateral direction although not distributed like a complete cross as in (a).

(a) shows a case where there is no displacement in the positional relationship between the sensing unit and the safe hole.

(b) shows a case where the sensing unit and safe hole are displaced by a half pitch in the longitudinal direction with respect to each other.

(c) shows a case where the sensing unit and safe hole are displaced a half pitch in both the longitudinal and lateral directions with respect to each other. The reason why such displacement occurs is that the sensing units 20a of the matrix sensor 20 are placed in a given pitch, but the positions of the safe holes 14a are determined properly for convenience of design.

As seen from the result, to sense whether or not a pinball exists at one point, if only one sensing unit is monitored, there is a chance that the pinball will be unable to be normally detected.

In contrast, on examination of the experiment data, in (a), it was found out that the sensing unit making the largest response to the presence of the pinball among a plurality of sensing units 20a is the sensing unit nearest to the pinball. In (b) and (c), it was found out that the sensing units 20a over which the pinball extends make a larger response to the presence of the pinball than other sensing units 20a where no pinball exists.

Then, as with the above-mentioned safe (winning game play) algorithm, the embodiment provides the following algorithm: When a plurality of sensing units are placed surrounding the sensing unit at the position where a pinball is to be sensed as a safe point, if the safe point (main detection point) makes a larger response than its surrounding detection points, the algorithm determines that a pinball exists at the safe point. In (a), the central detection point of the monitor frame F is used as the safe point; in (b) and (c), the sensing units covering the safe hole are used. For example, in (b), two sensing units are used as safe points; in (c), four sensing units are used. An ORing operation is performed on the sensing units. If the largest response is detected in any of the sensing units, the algorithm determines that a pinball exists at the safe points.

Since a response distribution of the sensing units to pinballs varies depending on factors such as the game machine structure, the distance between a pinball and sensing unit, and the pinball speed, the size and arrangement form of the monitor frame F may be selected appropriately according to experiments. However, according to the experiment carried out by the inventors and associates, placement of the monitor frame containing 13 sensing units so that a pair of vertexes as diagonals are placed on the top and bottom as shown in FIG. 11 generally has good adaptability. It is adopted in the embodiment.

With respect to this arrangement, FIG. 13 shows the evaluation results when the monitor frame size and arrangement form are changed. As shown here, when the number of detection points is nine, there is no problem with respect to the processing time, but effect removal performance when a pinball approaches a monitor frame is bad, namely, performance removing the effect, when a pinball does not exist in the monitor frame, but a part of the sensing units in the monitor frame responds to the pinball, is bad. On the other hand, when the number of points is 25, the effect removal performance when a pinball approaches a monitor frame is good, but there is a problem with respect to the processing time. In contrast, when the number of detection points is 13 in the embodiment, the effect removal performance when a pinball approaches a monitor frame is good and the number of detection points to be processed is slightly greater by four points compared with the number of points, 9, and is a half of 25 points. Therefore, the processing time becomes short. Thus, totally, the monitor frame containing 13 points and placed so that a pair of vertexes as diagonal becomes the top and bottom, is suitable.

The possible reason why the effect removal performance when a pinball approaches a monitor frame is bad when the number of points is nine is that when a pinball exists outside the monitor frame, which is small, the safe points in the monitor frame may make a relatively larger response than other points.

As shown in FIG. 3, the propelled pinball points are located in the portion, along the guide rail 12, through which pinballs are propelled into the game area 12a. Specifically, sensing units 20a contained in the circled portions in FIG. 3 are set, in which case six propelled pinball points SP1, SP2, SP3, SP4, SPS, and SP6 are set.

A case in which one propelled pinball point corresponds to one sensing unit 20a is the most standard, but the invention is not limited to it. For example, although the size of one point is the same as that of one sensing unit 20a, the point may be set extending over two contiguous sensing units 20a. One point can also be made up of a number of sensing units 20a, for example, four sensing units 20a.

The memory mounted on the card can use RAM, mask ROM, EPROM, one-shot ROM, etc.

A storage 174 connected to the control board 172 is used to record various pieces of data such as paths of pinballs moving in space between the base board 11 of the pinball machine 10 and the inner glass substance 17. The storage 174 can be provided by a hard disk storage device, for example. The data recorded in the storage 174 can be loaded into a computer 175 containing software for analyzing pinball paths and performing operations on the data to provide data required for the pinball parlor. All or a part of the data indicating the monitor points and the pinball detection algorithm may be stored in the storage 174.

The transmission circuit 40 is a circuit for transmitting a signal of a predetermined frequency to each transmission line 22 in sequence. The reception circuit 50 is a circuit for receiving a signal from each reception line 26 in sequence in synchronization with the transmission circuit 40. A continuous sine wave of frequency 1–1.3 MHz centering on 0 V is preferred as a voltage waveform applied to the transmission line 22 by the transmission circuit 40.

Figure 7:
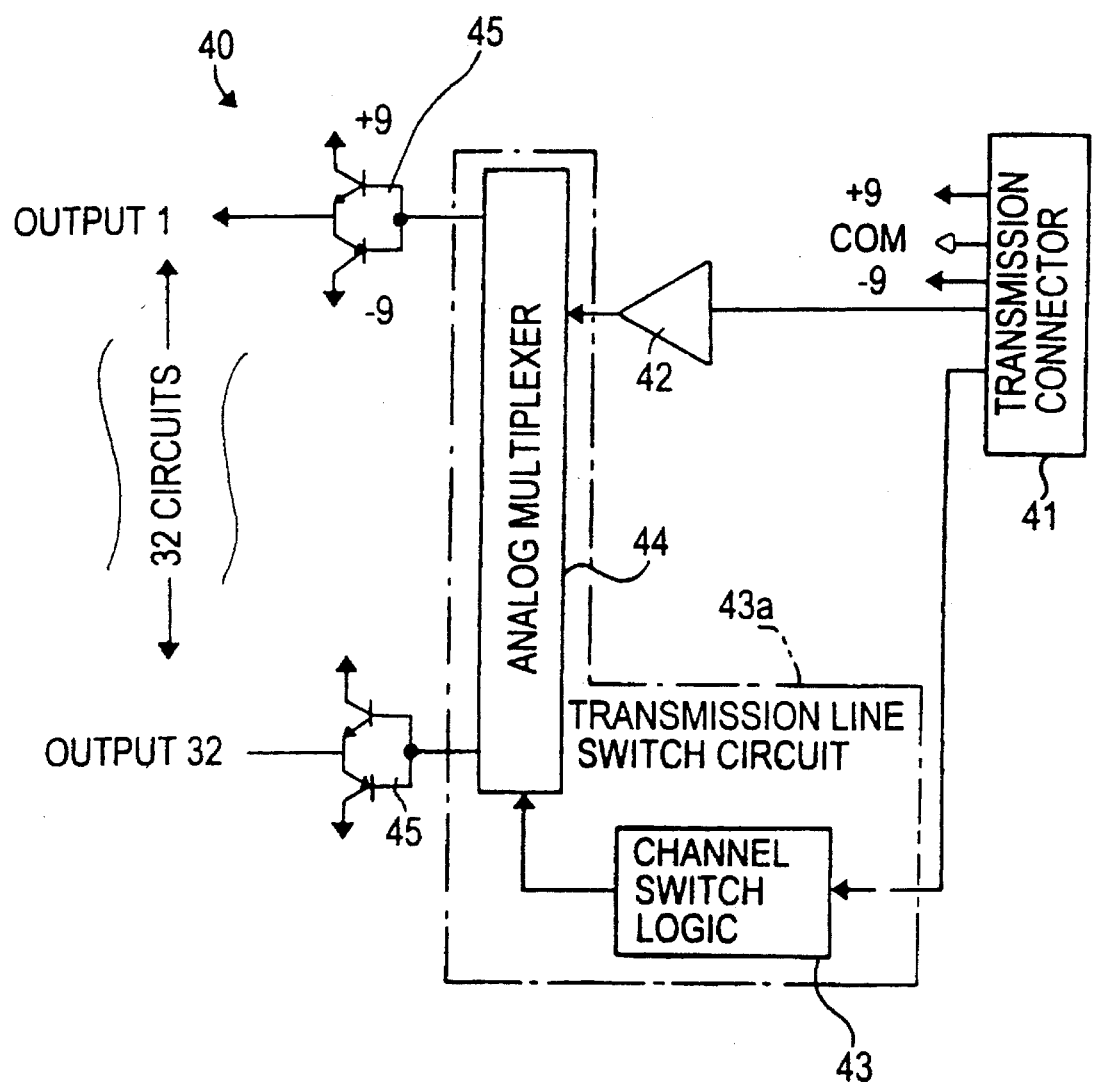
FIG. 7 is a block diagram of a transmission circuit of a transmission/reception board.

As shown in FIG. 7, the transmission circuit 40 consists of a transmission connector 41, an amplifier 42 connected to the transmission connector 41, a transmission line switch circuit 43a for switching the transmission line to which a signal current is to be transmitted in sequence each time a transmission line switch pulse is input, and 32 totem-pole drivers 45 each connected to one end of each of the 32 transmission lines 22 via the transmission connector 67a. The transmission line switch circuit 43a has a channel switch logic 43 and an analog multiplexer 44 being connected to the amplifier 42 and the channel switch logic 43 for switching so as to connect the amplifier 42 to the totem-pole driver 45 corresponding to the specified transmission line 22. Each totem-pole driver 45 comprises an NPN transistor and a PNP transistor, which have emitters connected to each other and bases connected to each other.

Figure 8:
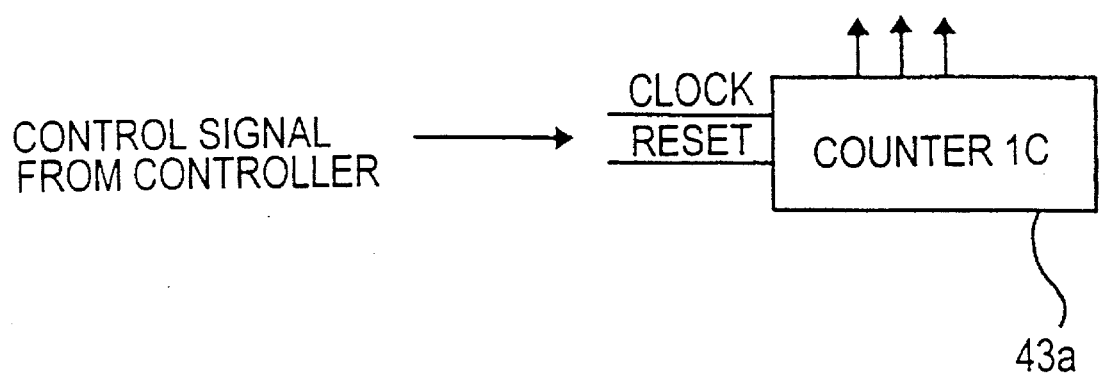
FIG. 8 is a block diagram showing the main part of a channel switch logic.

The channel switch logic 43 has a counter IC 43a and operates with two control lines for clock and reset, as shown in FIG. 8. Specifically, each time a transmission line switch pulse is input from a transmission line switch pulse generator 204 of a sequence controller 47 described below, the connection state of the analog multiplexer 44 is switched in sequence so as to connect to the specified transmission line.

Figure 9:
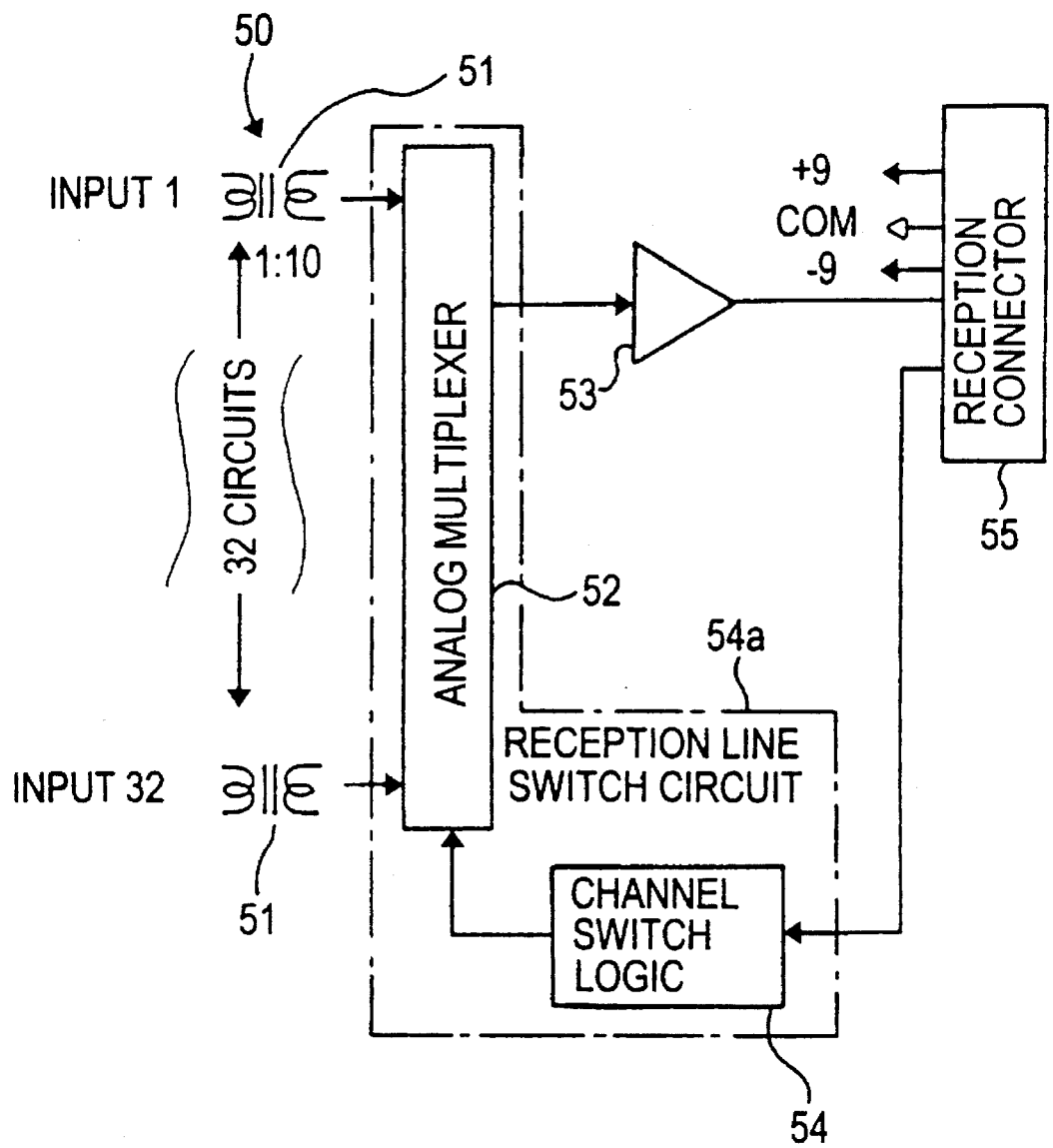
FIG. 9 is a block diagram of a reception circuit of the transmission/reception board.

As shown in FIG. 9, the reception circuit 50 consists of 32 CTs (current transformers) 51 connected to the 32 reception lines 26 via the reception connector 67b, a reception line switch circuit 54a being connected to the CTs 51 for switching the reception line to be detected in sequence each time a reception line switch pulse is input, an amplifier 53 connected to the reception line switch circuit 54a, and a reception connector 55 connected to the amplifier 53 and the reception line switch circuit 54a. The reception line switch circuit 54a has an analog multiplexer 52 and a channel switch logic 54 connected to the analog multiplexer 52. Therefore, the reception circuit 50 is adapted to receive a signal from each reception line 26 via each CT 51.

The CT 51 insulates its corresponding reception line 26 from the analog multiplexer 52 and magnifies a signal from the corresponding reception line 26 by 10 times. The analog multiplexer 52 receives signals in sequence from the specified CTs 51 based on a command from the channel switch logic 54. The amplifier 53 amplifies a signal from the analog multiplexer 52.

The channel switch logic 54 has similar elements to those of the channel switch logic 43 of the transmission circuit 40. Each time a reception line switch pulse is input from a reception line switch pulse generator 202 (described below) of the sequence controller 47 (every scanning period), the input switch state of the analog multiplexer 52 is changed on the falling edge of the pulse signal.

Figure 1:
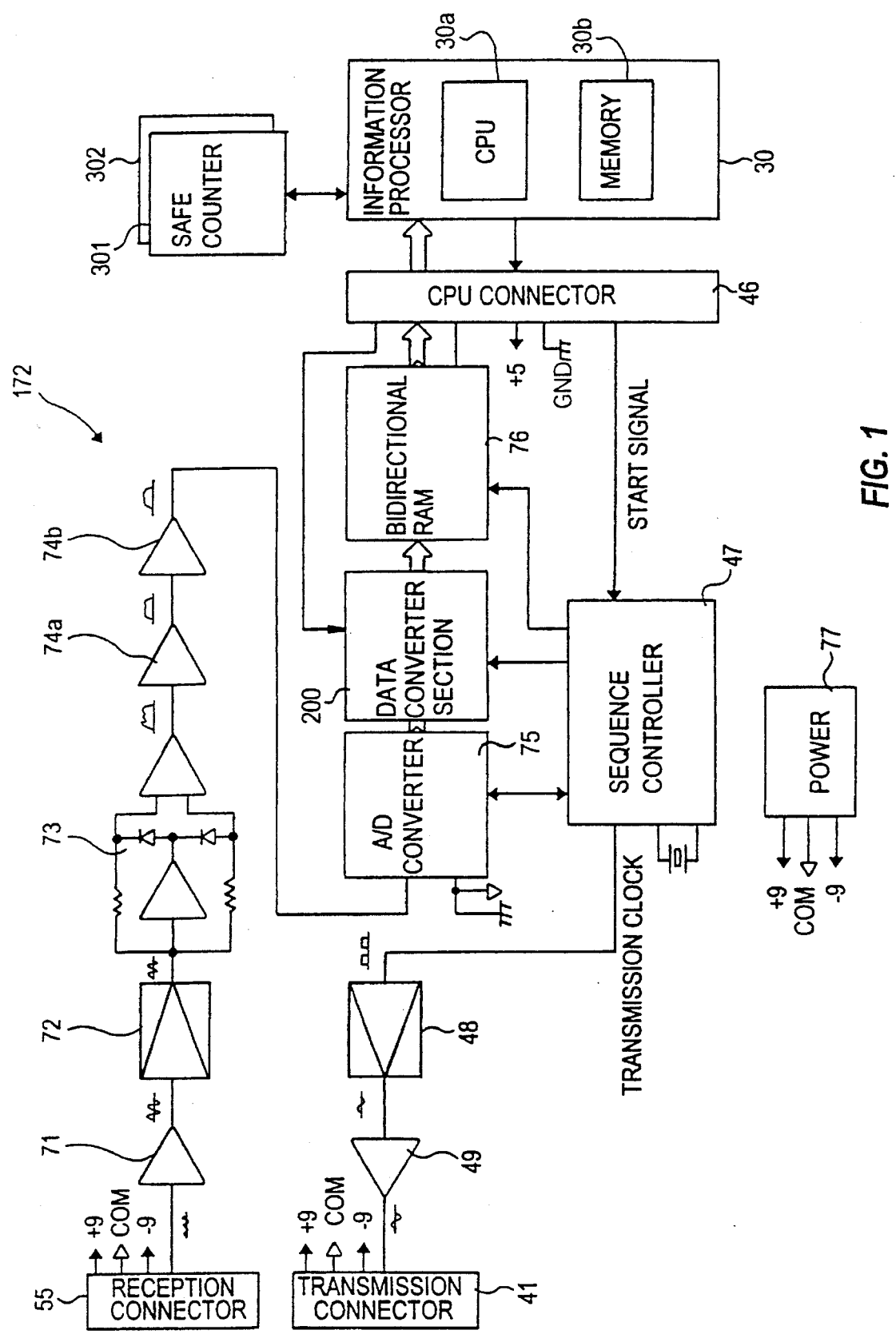
FIG. 1 is a block diagram showing the configuration of a control board used in embodiment of the invention.

As shown in FIG. 1, the control board 172, which contains the information processor 30, has a transmission section comprising a sequence controller 47 for sending a transmission clock in response to a start signal input from the information processor 30 via a CPU connector 46, a band-pass filter 48 for receiving the transmission clock and outputting a transmission signal, and an amplifier 49 for amplifying the transmission signal and sending the amplified signal to the transmission connector 41. A safe counter 301 for counting pinballs entering the safe holes and a propelled pinball counter 302 for counting propelled pinballs are connected to the information processor 30.

The control board 172 has a reception section comprising an amplifier 71 for amplifying a reception signal from the reception connector 55, a band-pass filter 72 for receiving the amplified signal, a full-wave rectification amplifier 73 for receiving the reception signal through the band-pass filter 72, two low-pass filters 74a and 74b for receiving the reception signal from the full-wave rectification amplifier 73, an A/D converter 75 for receiving the reception signal through the low-pass filter 74b, converting the reception signal into digital data under the control of the sequence controller 47, and outputting the digital data, a data converter section 200 for receiving the digital data as raw data X and converting the raw data X into response data Z representing the presence or absence of an electro-magnetic characteristic change at each sensing position (presence or absence of a pinball), and a bidirectional RAM 76 for writing the response data Z under the control of the sequence controller 47 and sending the response data Z via the CPU connector 46 to the information processor 30 in response to a read signal from the CPU connector 46.

Even if the matrix sensor 20 responds to the guide rail 12 (metal) on the base board 11, the characteristics of the amplifiers in the reception section are set so as to prevent the input signal caused by the response from exceeding the input voltage range of the A/D converter 75.

The data converter section 200 makes calculations from expressions (1) and (2) shown below and comprises components such as an operational circuit that can execute an absolute value subtraction and a memory for storing data A and S and the operation result.

$Y=|X-X_o|$  Expression (1)

$Z=Y-S$  Expression (2)

where $X_o$ denotes offset data, which is raw data X in the absence of a pinball, S denotes slice data having a predetermined fluctuation width value to remove a ripple of the raw data X, and Y denotes change data containing the ripple.

The bidirectional RAM 76 stores the response data Z for each sensing unit 20a under the control of the sequence controller 47. That is, the response data Z output from the data converter section 200 is registered in an address of the bidirectional RAM 76 specified by a signal from the sequence controller 47. The bidirectional RAM 76 has a capacity of 2048 bytes, for example.

The control board 172 has a power unit 77.

The counter 301 is provided to store the, number of pinballs entering the safe holes 14a and the counter 302 is provided to store the number of pinballs propelled into the game area (number of propelled pinballs). These counters count the signals from the information processor 30 for counting the numbers of pinballs mentioned here.

The information processor 30 reads the monitor data, etc., recorded on the card 173 and the response data Z stored in the bidirectional RAM 76, and relates the response data Z to the monitor data for monitoring pinballs. Particularly, the safe counter 301 operates according to a flowchart shown in FIG. 2; it reads the most recent response data Z on the safe point contained in a monitor frame F stored on the card 173 on a given sampling period and detects the presence or absence of a pinball at the safe point in the monitor frame F.

The sampling period is selected so as to reliably detect balls entering safe holes (winning game plays) and not to make a duplicate count. For example, preferably, the sampling period is set to the time slightly shorter than the time until a change in the response data Z disappears after a pinball arrives at a monitor frame and enters the safe hole in the frame. In the embodiment, the sampling period is set to 28 msec.

Figure 14:
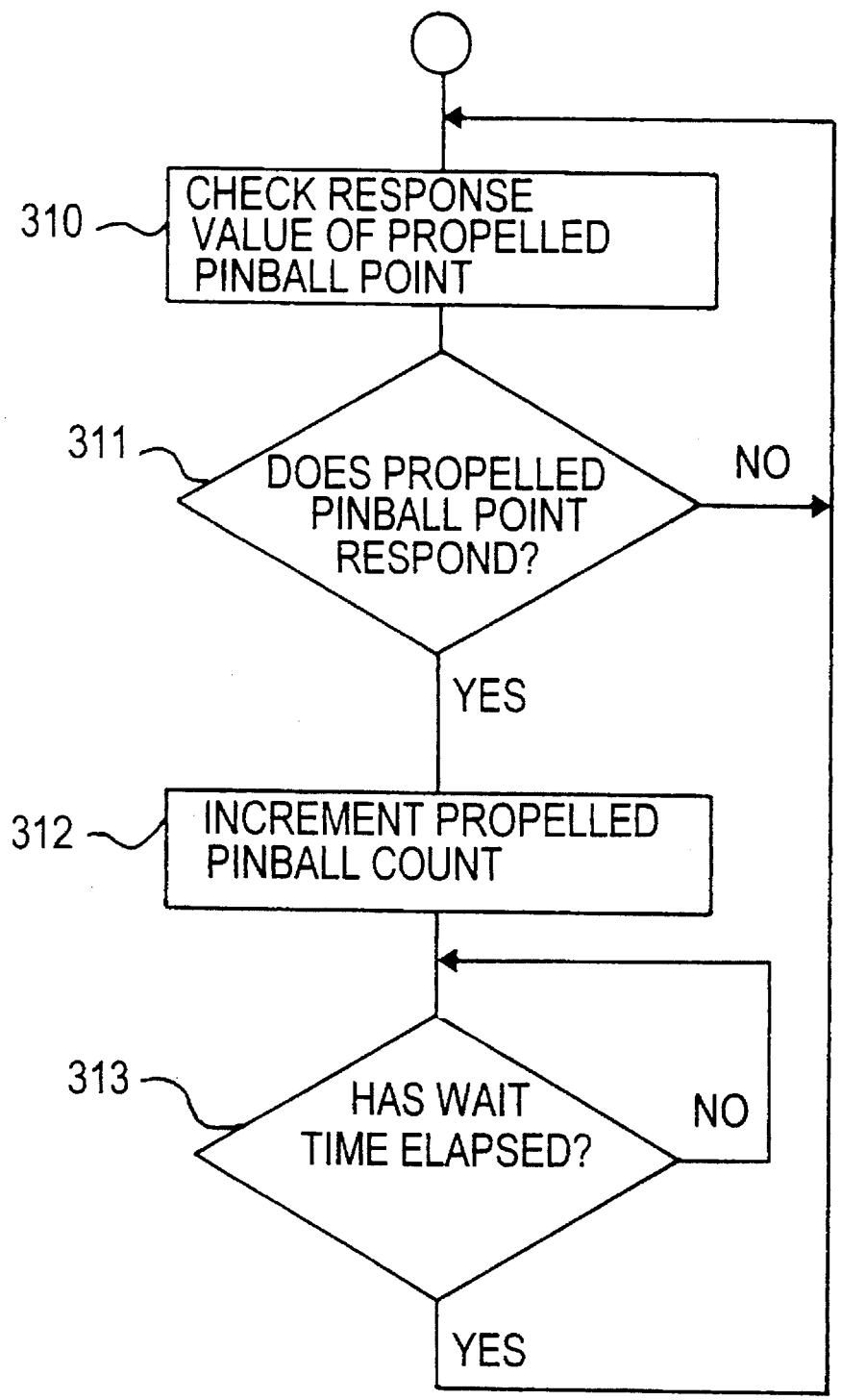
FIG. 14 is a flowchart showing a propelled pinball detection algorithm.

The propelled pinball counter operates according to a flowchart shown in FIG. 14; the most recent response data Z (sense data) on each propelled pinball point stored on the card 173 is read after the wait time has elapsed, and the propelled pinball counter 302 counts up the number of propelled pinballs in response to the value of the response data Z.

The wait time should be set to the time longer than the time required for a pinball to pass through the propelled pinball points and shorter than the pinball propelling period so as to reliably sense propelled pinballs and not to make a duplicate count. Specifically, 600 msec is preferred.

Next, the function of the embodiment will be described.

Figure 10:
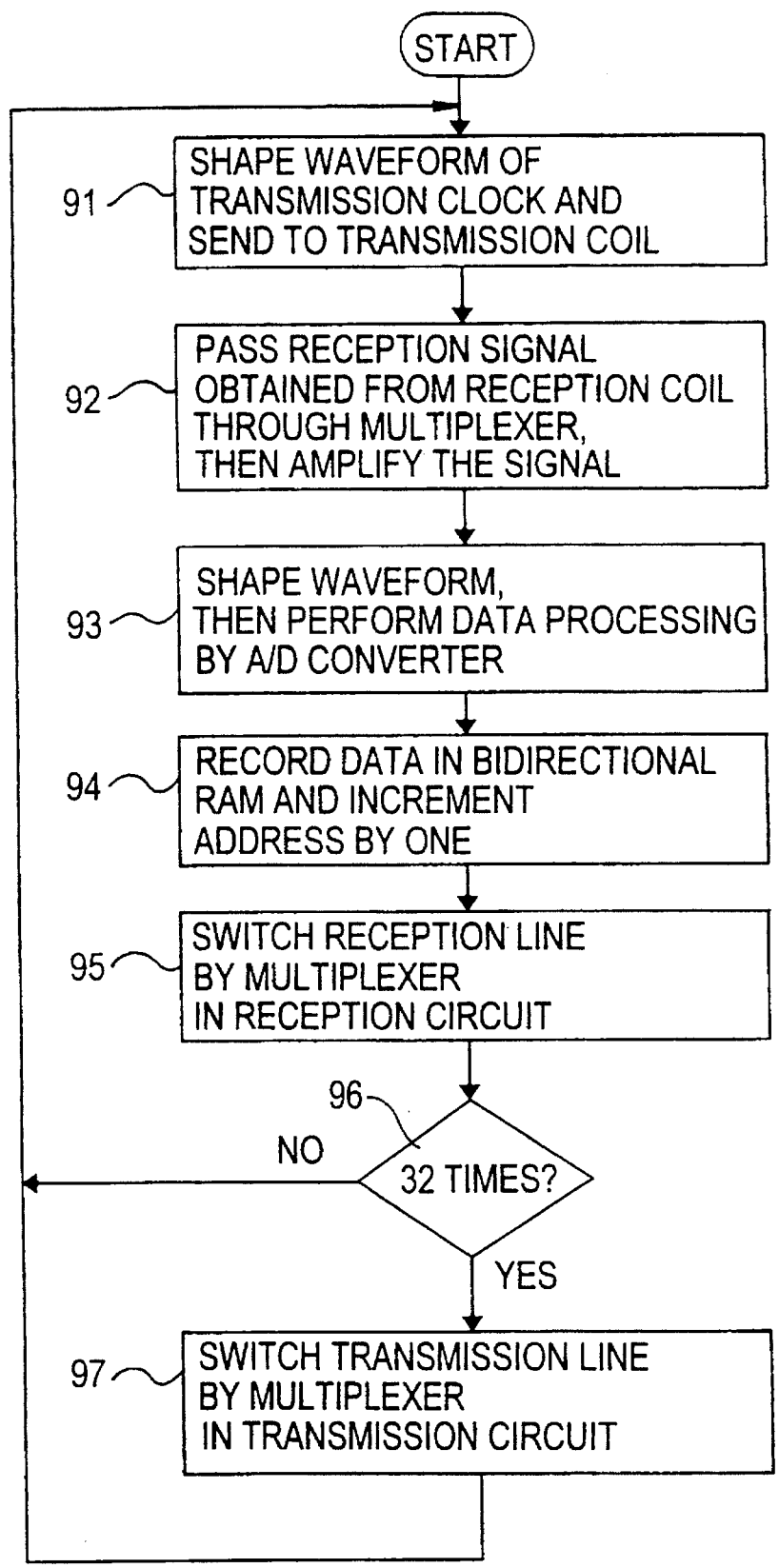
FIG. 10 is a flowchart of scanning of the matrix sensor.

Address signals and control signals from the information processor 30 are output via the CPU connector 46. FIG. 10 shows a processing flow.

First, adjustment of the system in pinball detection is described. Since various kinds of metal objects, such as the pins 13 and the guide rail 12, are placed on the base board 11, the A/D converter 75 is adjusted to prevent reception signals from the reception lines near them from becoming a saturated value due to the presence of the metal objects.

Also, safe monitor frames are specified. In the embodiment, each monitor frame is formed like a quadrilateral comprising 13 points, as described above.

Further, propelled pinball detection points are specified. Normally, five to ten points are set. In the embodiment, SP1 to SP6 are set, as shown in FIG. 3.

The monitor frames and the propelled pinball detection on setting them is written onto the card 173. Such adjustments points can be set for each pinball machine. Normally, information can be made, for example, when the pinball machine is installed. Readjustments can also be made after an appropriate period.

When a pinball machine is started, the information processor 30 reads the storage contents of the card 173 and stores them in the memory 30b.

When a start signal is transmitted from the information processor 30 to the sequence controller 47, the sequence controller 47 divides a 16-MHz basic clock in response to necessary clock frequency for generating and outputting a transmission clock. The waveform of the transmission clock from the sequence controller 47 is shaped from a digital signal into an analog signal through the band-pass filter 48, then the analog signal is amplified by the amplifier 49 and sent to the transmission connector 41.

Further, the transmission signal is amplified by the amplifier 42 in the transmission circuit 40. The analog multiplexer 44 operates the totem-pole drivers 45 in sequence on channels switched by the channel switch logic 43, whereby the totem-pole drivers 45 output the signal amplified by the amplifier 42 to the transmission lines 22 in sequence (step 91).

Then, an electromagnetic induction effect causes an electromotive force to occur on the reception lines 26 crossing the transmission line 22 on which the signal is transmitted. At this time, as a pinball which is metal approaches a sensing unit 20a, the magnitude of the electromotive force (induced current) of the reception line 26 changes in the sensing unit 20a.

The reason why it changes is not analyzed clearly at present, but can be considered as follows: First, a pinball, which is made of a material consisting essentially of iron, is a ferromagnetic substance. Thus, a magnetic flux occurring on the transmission line 22 and spread into a space converges on the pinball and the magnetic flux distribution interlinking the reception lines changes. Second, an eddy current occurs on the pinball in a direction of canceling the magnetic flux on the transmission line 22. These effects cause the induced current to change. Which cause is dominant varies depending on the relative positional relationship between the pinball and the transmission line 22 and reception line 26. Whether or not the magnetic flux interlinking with the reception line 26 increases also varies depending on the relative positional relationship with the pinball. It also varies depending on whether or not metal exists on the background. In any way, some change is caused to occur on the reception line, and thus may be detected.

In the reception section, the reception circuit 50 receives a signal from each reception line 26 via each CT 51 in synchronization with the transmission circuit 40 under the control of the sequence controller 47. As shown in FIG. 9, voltage caused by induced current appearing on the reception lines 26 is magnified by 10 times by the CT 51. This eliminates the need for the amplifier in the reception circuit to have a large amplification degree. The CTs 51 insulate the reception lines 26 of the matrix sensor 20 from the analog multiplexer 52 in the reception circuit 50 for preventing noise from entering the reception circuit 50 from the pinball machine 10.

The analog multiplexer 52 switches signals received from the reception lines 26 through the CTs 51 by the channel switch logic 54 and outputs them in sequence. Each signal output from the analog multiplexer 52 is amplified by 100 times by the amplifier 53 (step 92).

The reception signal is amplified and detected via the reception connector 55, the amplifier 71, and the band-pass filter 72. The reception signal passing through the band-pass filter 72 results in an analog signal, which is then shaped by the full-wave rectification amplifier 73. The output signal from the full-wave rectification amplifier 73 is averaged by integration processing through the low-pass filters 74a and 74b.

Next, the reception signal is sent to the A/D converter 75. The A/D converter 75 converts the signal from the reception line 26 into a digital signal in predetermined bit units, such as 12 bits, and outputs the resultant digital signal (sense data) to the bidirectional RAM 76 for storage under the control of the sequence controller 47 (step 93).

That is, the sense data is recorded in the bidirectional RAM 76 in response to a write signal from the sequence controller 47 independently of the operation of the information processor 30, then the address is incremented by one every scanning period based on the clock signal output by the sequence controller 47, for example, every clock (step 94), and the sense data is stored in a different address for each sensing unit 20a.

These steps are repeated every scanning period. That is, the analog multiplexer 52 in the reception circuit 50 switches the signal from each reception line 26 every scanning period at step 95 and the above-mentioned operation is performed 32 times for the 32 reception lines 26 (one for each line). Upon completion at step 96, the analog multiplexer 44 in the transmission circuit 40 switches the current transmission line 22 at step 97. Again, similar processing is repeated 32 times for storing the sense data for each sensing unit 20a in different addresses of the bidirectional RAM 76 in sequence in relation to the sensing units 20a.

Therefore, the information processor 30 can read the sense data stored in the bidirectional RAM 76 for judging that a pinball exists at what time at what position (sensing unit 20a ) under any desired retrieval conditions whenever necessary independently of the above-mentioned detection signal processing.

Thus, the CPU 30a of the information processor 30 can read the sense data recorded in the bidirectional RAM 76 into the memory 30b by a read start signal, as required, perform operations on the read sense data, and compare the sense data with the pinball monitor data stored on the card 173 for monitoring pinballs.

Figure 2:
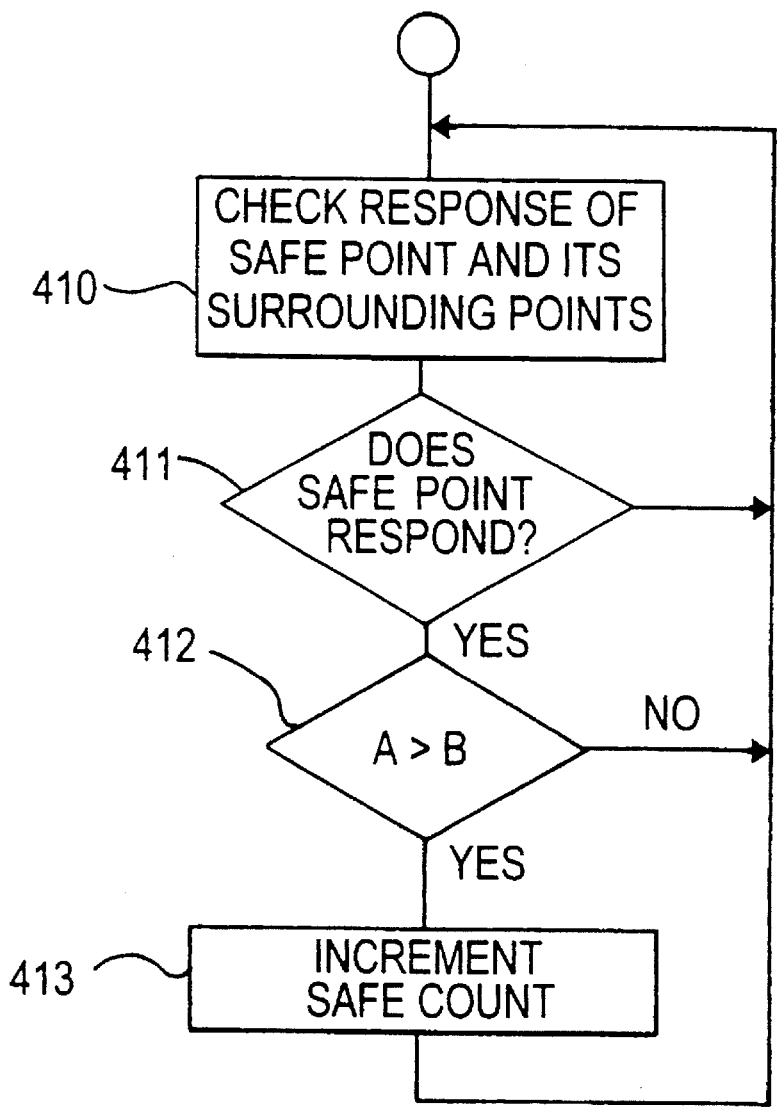
FIG. 2 is a flowchart showing a pinball detection algorithm at a safe hole.

Particularly, a safe count is made by repeating the operation shown in FIG. 2 on the above-mentioned sampling period. At step 410, the most recent response data Z about the safe point and its surrounding points contained in each monitor frame stored on the card 173 is read. Next, at step 411, whether or not the value of the response data Z (A) of the safe point is 0 is determined. If the value is 0, the process is terminated; otherwise, control advances to step 412.

Next, at step 412, the response data Z (A) of the safe point is compared with the response data Z (B) of each safe surrounding point. If the response data Z (A) of the safe point is greater than the response data Z (B) of every safe surrounding point, control advances to step 413 at which the value of the safe counter 301 is incremented corresponding to the safe point satisfying the condition at step 412.

Therefore, the pinball detection system always registers the number of pinballs entering each safe hole 14a in the safe counter 301 in real time; the value can be read whenever necessary for use as useful data for management of the pinball machine.

In the embodiment, to sense a pinball entering a safe hole 14a, sense data at detection points surrounding the safe hole 14a (response data Z of the safe surrounding points) is also analyzed, and it is determined that the center of the pinball is positioned securely at the safe hole 14a, then the value of the safe counter 301 is incremented, thereby preventing erroneous operation, such as erroneous measurement of also counting pinballs only passing by the safe point to provide high counting precision.

The number of propelled pinballs iS coupled by repeating the operation shown in FIG. 14. At step 310, the CPU 30a reads the most recent response data Z about the propelled pinball points SP1–SP6 stored on the card 173, and stores the data in the memory 30b. Next, at step 311, the CPU 30a searches for sense data read into the memory 30b for collecting the response data Z of each propelled pinball point, and determines whether or not the values are all 0. If the values are not all 0, the CPU 30a advances to step 312, and increments the value of the propelled pinball counter 302. At step 313, the CPU 30a waits for the predetermined wait time mentioned above, then again repeats the operation starting at step 310.

Thus, in the embodiment, the system may catch a pinball passing at any of the propelled pinball points SP1–SP6; the probability of being capable of detecting it at any point becomes high even if pinballs are propelled at high speed. For this reason, propelled pinball detection errors can be decreased and a propelled pinball counting error can also be lowered. Particularly, if the propelled pinball points SP1–SP6 are disposed along a pinball path along the guide rail 12, pinballs pass through all propelled pinball points SP1–SP6, thus the detection probability increases.

Therefore, the pinball detection system always registers the number of propelled pinballs in the propelled pinball counter 302 accurately in real time; the value can be read whenever necessary for use as useful data for management of the pinball machine.

In the embodiment, the monitor frames and the propelled pinball points are stored on the card 173 for rapid and easy replacement of pinball machines by supplying the monitor frames and propelled pinball points of a new pinball machine with the card. However, the invention is not limited to the card. They may be stored on any other storage medium, such as the memory 30b.

In the embodiment, in addition to the safe points, the propelled pinball points are specified, but may be unspecified. monitor frame can also be set in the part of the out hole for monitoring discharged pinballs.

We claim:

1. A metal object detection system comprising a matrix sensor having a detection area spreading over a plane and a signal processing system for driving the matrix sensor for detecting a metal object, said matrix sensor having a plurality of sensing units arranged in rows and columns, said signal processing system comprising:

means for setting a monitor frame consisting of a plurality of distributed sensing units in a specified detection area, selected from among the sensing units contained in said matrix sensor;

means for driving said matrix sensor and for receiving signals from said sensor; and means responsive to signals received from said plurality of distributed sensing units, for determining whether or not a metal object is present in the monitor frame, wherein said monitor frame setting means assigns at least one sensing unit to a main detection point corresponding to a target position to detect a metal object and assigns a sensing unit to each of a plurality of peripheral detection points placed surrounding the sensing unit belonging to the main detection point; and wherein when a metal object detection response is made at the main detection point for a signal from a sensing unit contained in the monitor frame, said means for determining whether or not a metal object is present compares the response with a response of the sensing unit of each of the other peripheral detection points in the frame, and when the response of the at least one sensing unit at the main detection point is greater than the response of the sensing unit of each of the other peripheral detection points, determines that a metal object exists at the main detection point.

2. The metal object detection system as claimed in claim 1 wherein said monitor frame comprises a quadrilateral containing a plurality of sensing units therewithin.

3. The metal object detection system as claimed in claim 2 wherein said main detection point consists of one sensing unit positioned at the center of the monitor frame.

4. The metal object detection system as claimed in claim 2 wherein said main detection point consists of a plurality of sensing units near the center of the monitor frame.

5. The metal object detection system as claimed in claim 1 wherein said matrix sensor comprises a plurality of transmission lines excited by a signal current, a plurality of reception lines crossing said plurality of transmission lines for receiving a current induced by exciting said transmission lines, and a board for supporting said lines, and wherein said sensing units are square portions formed by transmission lines and reception lines crossing each other.

6. The metal object detection system as claimed in claim 5, mounted on a pinball machine having a gamer area spreading over a plane and used for detecting presence or absence of a pinball at a specific position in the game area of the pinball machine, wherein said matrix sensor is formed so as to be placed facing a base board on which the game area of the pinball machine is provided, and wherein said signal processing system drives said sensor for sensing a pinball.

7. The metal object detection system as claimed in claim 6 wherein said monitor frame setting means sets the main detection point at a position of a safe hole made on the pinball machine, and the peripheral detection points are set surrounding the main detection point when said matrix sensor is fitted to the pinball machine.

8. The metal object detection system as claimed in claim 7 wherein said signal processing system further includes:

means for setting a plurality of sensing units as propelled pinball detection points in a portion into which pinballs are propelled in the game area of the pinball machine; and means for determining detection of a pinball propelled into the game area if a signal from any of the sensing units belonging to the setup detection points changes, compared with a predetermined criterion.

9. The metal object detection system as claimed in claim 7 wherein said signal processing system further includes a counter for counting the number of pinballs detected at the main detection point.

10. The metal object detection system as claimed in claim 8 wherein said signal processing system further includes a counter for counting the number of pinballs detected at any of the propelled pinball detection points.

11. The metal object detection system as claimed in claim 7 wherein said monitor frame setting means includes means for storing information specifying the sensing unit belonging to the main detection point and the sensing units belonging to the peripheral detection points.

12. The metal object detection system as claimed in claim 11 wherein said storage means is made of an exchangeable storage medium.

13. The metal object detection system as claimed in claim 2 wherein said quadrilateral has a symmetrical form with respect to one of its diagonal lines.

14. The metal object detection system as claimed in claim 13 wherein said one diagonal line is in parallel with a main movement direction of metal objects to be monitored on said matrix sensor.

15. The metal object detection system as claimed in claim 7 wherein said monitor frame comprises a quadrilateral containing a plurality of sensing units therewithin, and having a symmetrical form with respect to one of its diagonal lines, so that the one diagonal line is in parallel with a vertical direction of the pinball machine on said matrix sensor.

* * * * *